J. M. McGEHN.
Car Truck.

No. 91,956.    Patented June 29, 1869.

Witnesses;
E. Wolf
Wm A Morgan

Inventor;
John M. McGehn
pr. Munn & Co
Attorneys.

United States Patent Office.

JOHN M. McGEHU, OF MILTON, FLORIDA.

Letters Patent No. 91,956, dated June 29, 1869.

IMPROVED RAILWAY-CAR TRUCK.

The Schedule referred to in these Letters Patent and making part of the same.

*To all whom it may concern:*

Be it known that I, JOHN M. McGEHU, of Milton, in the county of Santa Rosa, and State of Florida, have invented a new and useful Improvement in Railroad-Cars; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

My invention has for its object to furnish a simple and convenient car, designed especially for use in hauling lumber and similar uses, in places where ordinary roads are difficult of construction, and where ordinary railroads, if built, would be too expensive; and It consists in the construction of the car, as hereinafter more fully described.

Figure 1:
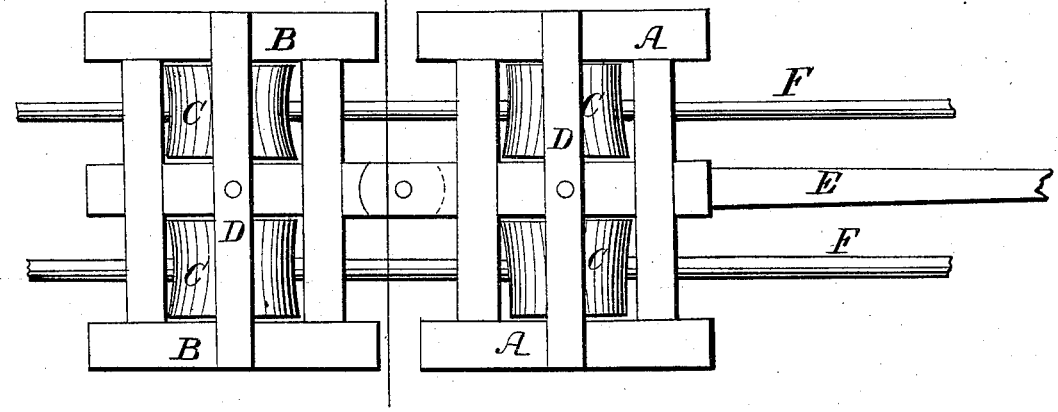
Figure 1 is a top view of my improved car upon the track.
Figure 2:
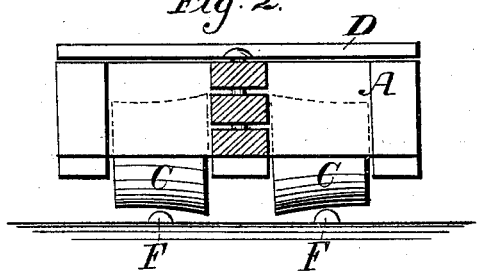
Figure 2 is a vertical cross-section of the same.

The frame of the car is formed by connecting the frames of two two-wheeled trucks, A and B, to each other, as shown in fig. 1, so that the car may conveniently pass around bends, or turns of the track.

The broad wheels C C, of the forward truck A, are made slightly cone-shaped, and placed upon their axles with their bases toward the central line of the car, so that the tendency may be to keep the car directly over the centre of the track.

The rear truck B is provided with the equally broad wheels C' C', having concave peripheries, as shown in fig. 1.

By forming the wheels of the forward truck coneshaped, the car may be easily drawn back upon the rails, in case of becoming displaced by accident or otherwise.

A bolster, D, is pivoted to the central frame-piece, or beam of each truck, so that the frames may be free to get out of line with each other in passing around bends in the track, without disturbing the loading.

E is the tongue, to which the mules or other draught-animals are attached, and which is rigidly attached to the forward truck-frame A, so as to guide the car, and keep it upon the track.

This car is designed for use exclusively on rails formed of rough or round timber, which are laid down without any special regard to accuracy of gauge, the construction of the wheels enabling the car to be readily kept upon the rails.

I am aware that car-wheels having bevelled edges have heretofore been constructed, but as these form no part of my invention, I do not, therefore, claim them; but

I claim as new, and desire to secure by Letters Patent—

The railroad-car, consisting of the two two-wheeled trucks A and B, each provided with the swinging bolster D, the forward truck A being supported on the cone-shaped wheels C C, arranged with their bases toward the central line of the car, and the rear truck B provided with the wheels C' C', having concave peripheries, all constructed as described, whereby the car is adapted for use on tracks of irregular gauge, for the purpose specified.

JOHN M. McGEHU.

Witnesses:
JOHN HOODLESS,
JOHN G. ELLIS.